United States Patent
Liu

(10) Patent No.: US 12,430,789 B2
(45) Date of Patent: Sep. 30, 2025

(54) IMAGE PROCESSING METHOD AND APPARATUS, AND COMPUTER-READABLE STORAGE MEDIUM

(71) Applicant: TENCENT TECHNOLOGY (SHENZHEN) COMPANY LIMITED, Shenzhen (CN)

(72) Inventor: Junyu Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 364 days.

(21) Appl. No.: 18/073,343

(22) Filed: Dec. 1, 2022

(65) Prior Publication Data
US 2023/0094362 A1 Mar. 30, 2023

Related U.S. Application Data

(63) Continuation of application No. PCT/CN2022/087785, filed on Apr. 20, 2022.

(30) Foreign Application Priority Data

May 17, 2021 (CN) .......................... 202110534980.3

(51) Int. Cl.
*G06T 7/70* (2017.01)
*G06T 3/40* (2006.01)
(Continued)

(52) U.S. Cl.
CPC ............... *G06T 7/70* (2017.01); *G06T 3/40* (2013.01); *G06T 7/10* (2017.01); *G06V 40/168* (2022.01); *G06T 2207/20132* (2013.01)

(58) Field of Classification Search
CPC .... G06T 7/70; G06T 3/40; G06T 7/10; G06T 2207/20132; G06T 2207/30196;
(Continued)

(56) References Cited

U.S. PATENT DOCUMENTS

2003/0123754 A1* 7/2003 Toyama .................... G06T 7/74
   382/291
2004/0022423 A1* 2/2004 Chen ..................... G06V 40/161
   382/118

(Continued)

FOREIGN PATENT DOCUMENTS

CN 103914689 A 7/2014
CN 103927713 A 7/2014
(Continued)

OTHER PUBLICATIONS

The World Intellectual Property Organization (WIPO) International Search Report for PCT/CN2022/087785 Jun. 29, 2022 7 Pages (including translation).

(Continued)

*Primary Examiner* — Ali Bayat
(74) *Attorney, Agent, or Firm* — ANOVALAW GROUP PLLC

(57) ABSTRACT

Embodiments of this application provide an image processing method and apparatus, and a computer-readable storage medium. The image processing method includes obtaining an image and size information corresponding to the image; determining a target center point of the image according to position information of facial feature information in the image; determining cropped size information according to an aspect ratio relationship between the size information and target size information, the target size information being size information of a thumbnail that is to be generated and corresponds to the image; cropping the image based on the target center point and the cropped size information to obtain a target image, an aspect ratio of the target image being same as an aspect ratio of the target size information; and scaling the target image according to the target size information, to generate the thumbnail with the target size information.

18 Claims, 5 Drawing Sheets

Terminal 11

To-be-processed image

Server 12

(51) Int. Cl.
*G06T 7/10* (2017.01)
*G06V 40/16* (2022.01)

(58) Field of Classification Search
CPC .... G06T 7/60; G06T 7/73; G06T 7/62; G06T 2207/20224; G06V 40/168; G06V 10/25; G06V 10/82; G06V 40/171
USPC .......................................................... 382/100
See application file for complete search history.

(56) References Cited

U.S. PATENT DOCUMENTS

| | | | |
|---|---|---|---|
| 2006/0188173 A1 | 8/2006 | Zhang et al. | |
| 2014/0321770 A1* | 10/2014 | Potdar | G06T 11/60 382/282 |
| 2021/0073987 A1* | 3/2021 | Tegzes | G06T 7/11 |
| 2021/0158021 A1* | 5/2021 | Wu | G06V 10/764 |
| 2021/0295504 A1* | 9/2021 | Amundson | G06V 10/7715 |
| 2022/0027661 A1* | 1/2022 | Deng | G06V 10/22 |
| 2022/0139008 A1* | 5/2022 | Zhang | G06V 40/161 382/103 |
| 2022/0254058 A1 | 8/2022 | Liu | |
| 2022/0270343 A1* | 8/2022 | Wu | G06T 7/194 |

FOREIGN PATENT DOCUMENTS

| | | |
|---|---|---|
| CN | 108776970 A | 11/2018 |
| CN | 110136142 A | 8/2019 |
| CN | 110363133 A | 10/2019 |
| CN | 110580678 A | 12/2019 |
| CN | 111460929 A | 7/2020 |
| CN | 112016548 A | 12/2020 |
| CN | 112446255 A | 3/2021 |
| CN | 112700454 A | 4/2021 |
| CN | 112927241 A | 6/2021 |
| CN | 113538502 A | 10/2021 |
| CN | 113709386 A | 11/2021 |
| CN | 113763242 A | 12/2021 |

OTHER PUBLICATIONS

China National Intellectual Property Administration (CNIPA) Office Action 1 for Application No. 202110534980.3 Apr. 8, 2025 10 Pages (including translation).
China National Intellectual Property Administration (CNIPA) Office Action 2 for Application No. 202110534980.3 Jun. 30, 2025 12 Pages (including translation).
Anonymous, "Exploration of Intelligent Image Processing [I]: Face Recognition Image Cropping", https://cloud.tencent.com/developer/article/1174861, Aug. 2, 2018 (Aug. 2, 2018).

* cited by examiner

IMAGE PROCESSING METHOD AND APPARATUS, AND COMPUTER-READABLE STORAGE MEDIUM

RELATED APPLICATIONS

This application is a continuation of PCT Application No. PCT/CN2022/087785, filed on Apr. 20, 2022, which claims priority to Chinese Patent Application No. 202110534980.3, entitled "IMAGE PROCESSING METHOD AND APPARATUS, AND COMPUTER-READABLE STORAGE MEDIUM" filed on May 17, 2021. The two applications are incorporated by reference in their entirety.

FIELD OF THE TECHNOLOGY

This application relates to the field of computer technologies, and specifically, to an image processing method and apparatus, and a computer-readable storage medium.

BACKGROUND OF THE DISCLOSURE

With the maturity of electronic technologies, more digital products are produced, thereby bringing great convenience to people. In daily life, users can shoot or create their own video works at any time using digital products.

To attract users to watch a video, it is necessary to manually select and edit images in a video work, to create a suitable image for placement as a video poster image.

SUMMARY

An embodiment of this application provides an image processing method. The method is performed by a computer device, and includes obtaining an image and size information corresponding to the image; determining a target center point of the image according to position information of facial feature information in the image; determining cropped size information according to an aspect ratio relationship between the size information and target size information, the target size information being size information of a thumbnail that is to be generated and corresponds to the image; cropping the image based on the target center point and the cropped size information to obtain a target image, an aspect ratio of the target image being same as an aspect ratio of the target size information; and scaling the target image according to the target size information, to generate the thumbnail with the target size information.

An embodiment of this application further provides a non-transitory computer-readable storage medium, storing a plurality of instructions, the instructions being configured to be loaded by a processor, to perform the steps in the foregoing image processing method.

An embodiment of this application further provides a computer device, including a memory, a processor, and a computer program stored in the memory and runnable on the processor, the processor, when executing the computer program, implementing the steps in the foregoing image processing method.

An embodiment of this application further provides a computer program product or a computer program, the computer program product or the computer program including computer instructions, the computer instructions being stored in a computer-readable storage medium. A processor of the computer device reads the computer instructions from the storage medium, and the processor executes the computer instructions, to cause the computer device to perform the steps in the foregoing image processing method.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

The technical solutions in the embodiments of this application are clearly and completely described with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the related art, a process of manually selecting and creating a suitable image as a video poster is cumbersome and inefficient, resulting in low image processing efficiency. The embodiments of this application provide an image processing method and apparatus, and a computer-readable storage medium, which can improve the image processing efficiency.

Figure 1:
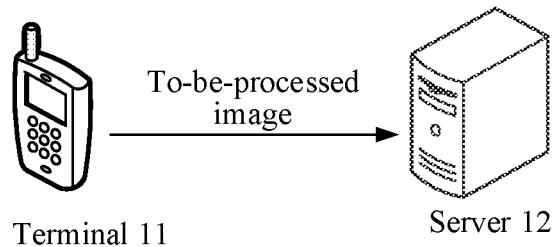
FIG. 1 is a schematic diagram of a scenario of an image processing system according to an embodiment of this application.

FIG. 1 is a schematic diagram of a scenario of an image processing system according to an embodiment of this application. The image processing system includes: a terminal 11 and a server 12 (where the image processing system may further include another terminal other than the terminal 11, and a number of terminals is not specifically limited herein). The terminal 11 and the server 12 may be connected through a communication network, and the communication network may include a wireless network and a wired network. The wireless network includes one of or a combination of multiple of a wireless wide area network, a wireless local area network, a wireless metropolitan area network, or a wireless personal network. The network includes network entities such as a router and a gateway, which are not shown in the figure. The terminal 11 may perform information interaction with the server 12 through the communication network, for example, the terminal 11 sends an image to be processed the server 12 through a client.

The image processing system may include the image processing apparatus, the image processing apparatus may be integrated in a computer device, and the computer device may be the terminal 11 or the server 12 or another device. The terminal 11 may be a mobile phone, a tablet computer, a notebook computer, a smart television, a wearable smart device, a desktop computer, or another device. By using the image processing method being performed by the server 12 as an example, the server 12 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. As shown in FIG. 1, the server 12 may obtain an image to be processed and size information corresponding to the image to be processed; determine a target center point according to position information of facial feature information in the image to be processed; determine cropped size information according to an aspect ratio relationship between the size information and target size information; crop the image to be processed based on the target center point and the cropped size information to obtain a target image, an aspect ratio of the target image being same as an aspect ratio of the target size information; and scale the target image to the target size information.

The terminal 11 may include a client, the client may be a video client, a game client, an instant messaging client, a document editing client, or the like, and the terminal 11 may use a video frame of a game in the game client as an image to be processed and send it to the server 12.

The schematic diagram of the scenario of the image processing system shown in FIG. 1 is merely an example. The image processing system and the scenario described in the embodiments of this application are intended to more clearly describe the technical solutions in the embodiments of this application, and do not constitute a limitation on the technical solutions provided in the embodiments of this application. A person of ordinary skill in the art may learn that, with evolution of the image processing system and appearance of a new service scenario, the technical solutions provided in the embodiments of this application also apply to a similar technical problem.

Detailed descriptions are provided respectively in the following.

An embodiment of this application provides an image processing method. The method may be performed by a terminal or a server, or may be jointly performed by the terminal and the server. In this embodiment, description is made by using an example in which the image processing method is performed by the server.

Figure 2:
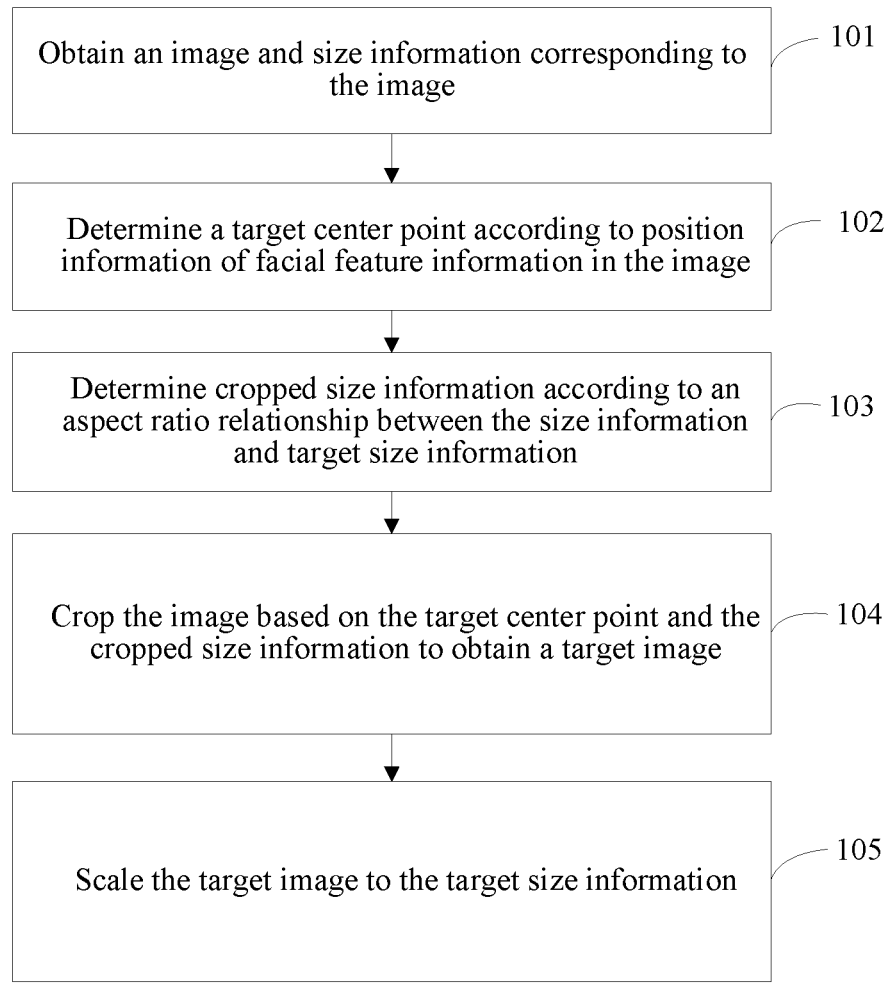
FIG. 2 is a schematic flowchart of an image processing method according to an embodiment of this application.

FIG. 2 is a schematic flowchart of an image processing method according to an embodiment of this application. The image processing method includes the following steps:

In step 101, obtain an image to be processed and size information corresponding to the image to be processed.

The image to be processed may be a game image in a game client, an image of a specific frame in a video client, an image in an instant messaging client, or the like, and a format of the image to be processed may be a bitmap (bmp), a Joint Photographic Experts Group (JPEG), or the like, which are not specifically limited herein.

To attract users to watch a video, a game, or other content corresponding to the image to be processed, a thumbnail corresponding to the image to be processed needs to be created. The thumbnail may also be referred to as a poster image, and the poster image may be used as a marketing tool. Because the thumbnail generally has a fixed size and the fixed size is different from a size ratio of the image to be processed, the thumbnail is a part of the image to be processed, that is, to-be-processed image needs to be cropped. The image to be processed is cropped manually, resulting in relatively poor efficiency. Therefore, to realize subsequent automatic cropping in this embodiment, the image to be processed and the size information corresponding to the image to be processed may be pre-obtained, and the size information may be a width×a height, for example, 1280 pixels×720 pixels.

In step 102, determine a target center point according to position information of facial feature information in the image to be processed.

In one use scenario, for an image to be processed with a face, the face may be used as a main body of the image to be processed for cropping. Therefore, a region part of the face needs to be preferentially reserved as a target center point of the image to be processed.

In this embodiment, the facial feature information may be identified combined with a computer vision technology (CV). The CV technology is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific subject, the computer vision studies related theories and technologies and attempts to establish an artificial intelligence system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition. The facial feature information may be feature expression information included by facial features of the face, and a center point of the position information of the facial feature information may be used as the target center point, thereby realizing that the face may be used as the main body for subsequent cropping.

In some embodiments, the step of determining a target center point on the according to position information of facial feature information in the image to be processed may include:

(1) obtaining an identification box corresponding to the facial feature information in the image to be processed;
(2) determining, in a case of detecting that the image to be processed includes a single identification box, the target center point according to the single identification box; and
(3) connecting, in a case of detecting that the image to be processed includes a plurality of identification boxes, the plurality of identification boxes to generate a target connection box, and determining the target center point according to the target connection box.

The facial feature information in the image to be processed may be identified by a convolutional neural network (CNN), and the convolutional neural network may be constructed by imitating a biological visual perception mechanism. Therefore, the convolutional neural network may be configured to identify the facial feature information in the image to be processed, and select the facial feature information with a rectangular or circular identification box.

Further, because there may be one or more faces in the image to be processed and a plurality of faces need to be used as a main body for display when there are the plurality of faces, it may be pre-detected that the image to be processed includes one or more identification boxes, and each identification box represents one face. In a case of detecting that the image to be processed includes a single identification box, it indicates that the image to be processed only includes one face, and a center point of the single identification box may be directly used as the target center point.

In a case of detecting that the image to be processed includes a plurality of identification boxes, it indicates that the image to be processed includes a plurality of faces, the plurality of identification boxes may be connected to generate a region of a target connection box, and a center point of the target connection box may be used as the target center point, to ensure that the plurality of faces are reserved as much as possible as the main body in subsequent cropping.

In step 103, determine cropped size information according to an aspect ratio relationship between the size information and target size information.

The target size information is size information of a thumbnail (namely, a poster image) that is to be generated and corresponds to the image to be processed, and is size information of an image that a system or user intends to obtain. To improve the cropping efficiency, an aspect ratio refers to a ratio of a width of an image to a height thereof.

When an aspect ratio of the image to be processed is consistent with an aspect ratio of the thumbnail, a size of the image to be processed may be directly scaled to a size of the thumbnail, to realize creation of the thumbnail. However, the aspect ratio of the image to be processed is different from the aspect ratio of the thumbnail. In this embodiment, to realize the creation of the thumbnail, the aspect ratio of the image to be processed may be transformed to being same as the aspect ratio of the thumbnail, and for convenience of cropping, one edge of the image to be processed may be fixed, and another edge may be cropped, so that an aspect ratio of a cropped image is same as the aspect ratio of the thumbnail.

Specifically, when the aspect ratio of the image to be processed is larger than the aspect ratio of the thumbnail, a height edge may be fixed, and a width edge may be cropped. Assuming that a width and a height of the image to be processed are w and h respectively and a width and a height of the thumbnail are w' and h' respectively, a cropped width $w1=hw'/h'$ may be calculated to cause $w/h=w'/h'$, and the image to be processed is cropped by using $w1$ and $h$ as the cropped size information, so that the aspect ratio of the cropped image is the same as the aspect ratio of the thumbnail.

When the aspect ratio of the image to be processed is smaller than the aspect ratio of the thumbnail, the width edge may be fixed, and the height edge may be cropped. Assuming that a width and a height of an original image are w and h respectively and cropped width and height are w' and h' respectively, a cropped height $h1=wh'/w'$ may be calculated to cause $w/h=w'/h'$, and the image to be processed is cropped by using w and $h1$ as the cropped size information, so that the aspect ratio of the cropped image is the same as the aspect ratio of the thumbnail.

In step 104, crop the image to be processed based on the target center point and the cropped size information to obtain a target image.

To unify the aspect ratios of the image to be processed and the thumbnail to realize the creation of the poster image with the size information of the thumbnail, the target center point may be used as a relative reference center, that is, the target center point is used as a cropping reference center, and the image to be processed is cropped through the cropped size information to obtain the target image with the same aspect ratio as the thumbnail.

In step 105, scale the target image to the target size information.

Because an aspect ratio of the target image after cropping is consistent with the aspect ratio of the target image, the target image may be directly scaled to the target size information, to generate the thumbnail with the target size information, that is, to obtain a poster image with a face as a main body and with the same size as the thumbnail for publicity. In this way, an operator can process a large number of images more conveniently and quickly, and display the target image scaled to the target size information, which can well promote the image to be processed.

In one embodiment, a customized image layer or control may be added for the scaled target image, thereby enhancing the publicity effect.

It is understood from the above that, in this embodiment, an image to be processed and size information corresponding to the image to be processed are obtained; a target center point is determined according to position information of facial feature information in the image to be processed; cropped size information is determined according to an aspect ratio relationship between the size information and target size information; the image to be processed is cropped based on the target center point and the cropped size information to obtain a target image; and the target image is scaled to the target size information. In this way, the target center point of the image is determined according to the facial feature information, the cropped size information is determined according to the aspect ratio relationship between the size information and the target size information for cropping to obtain the target image whose aspect ratio meets a requirement, and the target image is scaled to the target size information to quickly generate a thumbnail that meets the requirement. Compared with the solution in which a poster image needs to be selected and edited manually, manual intervention is not required in this embodiment, which greatly improves the image processing efficiency.

With reference to the method described in the foregoing embodiments, the following further provides detailed description by using examples.

In this embodiment, an example in which an image processing apparatus is specifically integrated in a server is used for description, and reference is specifically made to the following description.

Figure 3:
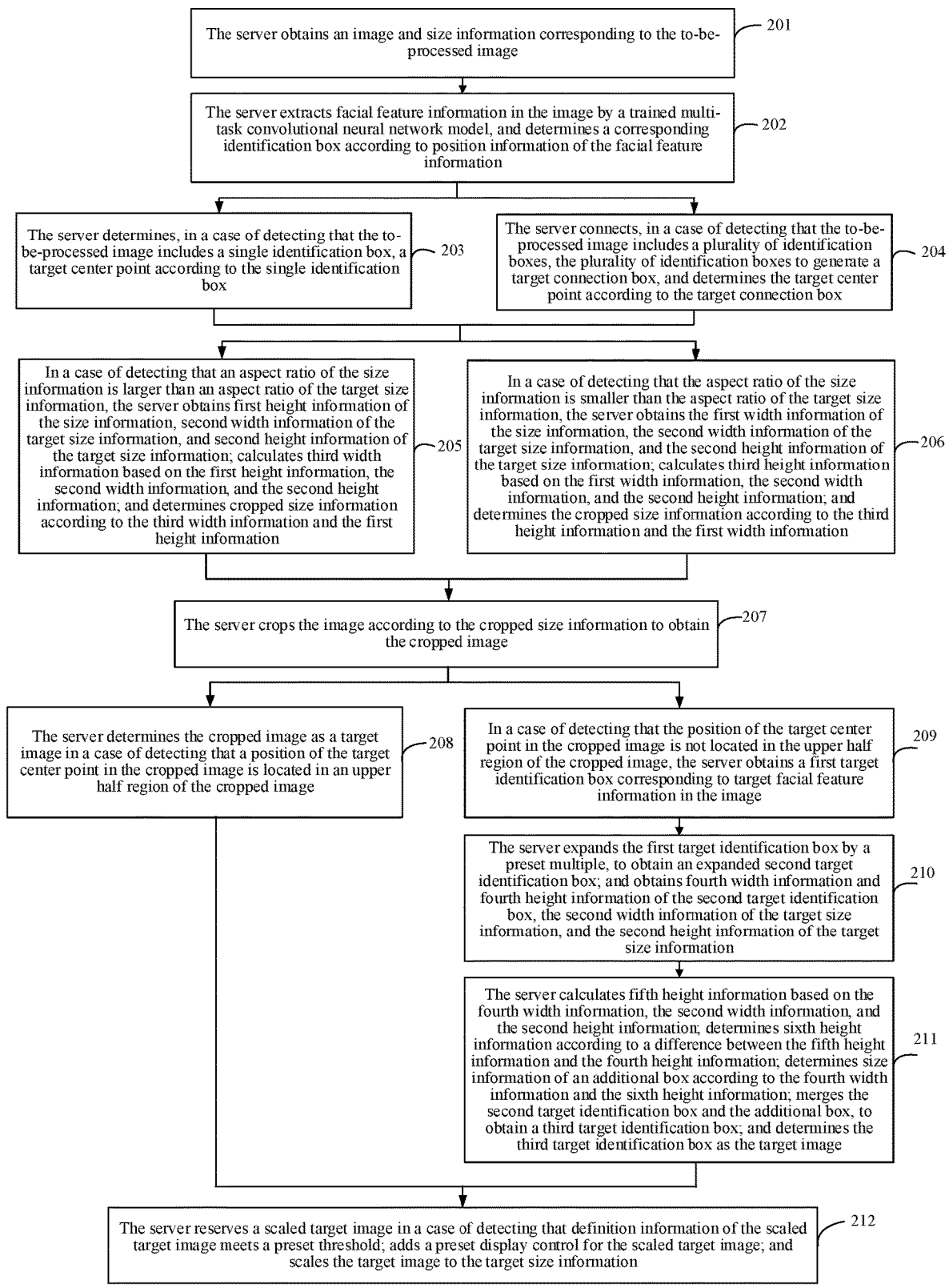
FIG. 3 is another schematic flowchart of an image processing method according to an embodiment of this application.

FIG. 3 is another schematic flowchart of an image processing method according to an embodiment of this application. The method process may include the following steps:

In step 201, the server obtains an image to be processed and size information corresponding to the image to be processed.

Figure 4A:
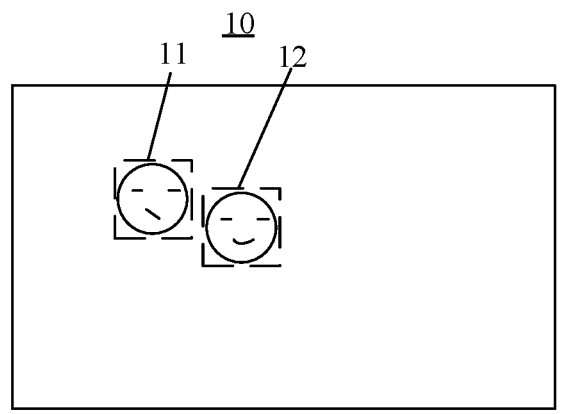
FIG. 4a is a schematic diagram of a scenario of an image processing method according to an embodiment of this application.

Referring to FIG. 4a, an image to be processed 10 may a frame of image in an XX video. To create a poster image of the XX video for publicity, in this embodiment, the image to be processed 10 and size information corresponding to the image to be processed may be pre-obtained, and the size information may be 1280 pixels×720 pixels.

In step 202, the server extracts facial feature information in the image to be processed by a trained multi-task convolutional neural network model, and determines a corresponding identification box according to position information of the facial feature information.

The multi-task convolutional neural network (MTCNN) model is a multi-task convolutional neural network model configured to perform a face detection task, and the model mainly uses three cascaded networks, and uses an idea of a candidate box plus a classifier, to perform quick and efficient face detection. Therefore, still referring to FIG. 4a, the server may extract facial feature information in the image to be processed 10 by the trained MTCNN model, and calibrate an identification box 11 (a candidate box) and an identification box 12 according to position information of the facial feature information, where each identification box may be a rectangle, and the identification box includes facial feature information of a single face.

In step 203, the server determines, in a case of detecting that the image to be processed includes a single identification box, a target center point according to the single identification box.

If detecting that the image to be processed only includes a single identification box, the server may directly use a rectangular center point of the single identification box as the target center point.

In step 204, the server connects, in a case of detecting that the image to be processed includes a plurality of identification boxes, the plurality of identification boxes to generate a target connection box, and determines the target center point according to the target connection box.

Figure 4B:
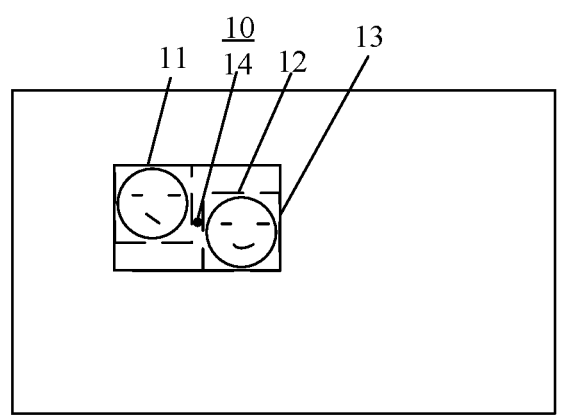
FIG. 4b is a schematic diagram of another scenario of an image processing method according to an embodiment of this application.

Referring to FIG. 4b, in a case of detecting that the image to be processed 10 includes a plurality of identification boxes, namely, the identification box 11 and the identification box 12, the server connects the identification box 11 and the identification box 12 to generate a target connection box 13 including the identification box 11 and the identification box 12, and uses a center point of the target connection box 13 as a target center point 14, to ensure that a plurality of faces are reserved as much as possible as the main body in subsequent cropping.

In step 205, in a case of detecting that an aspect ratio of the size information is larger than an aspect ratio of the target size information, the server obtains first height information of the size information, second width information of the target size information, and second height information of the target size information; calculates third width information based on the first height information, the second width information, and the second height information; and determines cropped size information according to the third width information and the first height information.

An aspect ratio of the image to be processed is different from an aspect ratio of a thumbnail (namely, a poster image). In this embodiment, to realize the creation of the thumbnail, the aspect ratio of the image to be processed may be transformed to being same as the aspect ratio of the thumbnail, which is specifically described below.

Figure 4C:
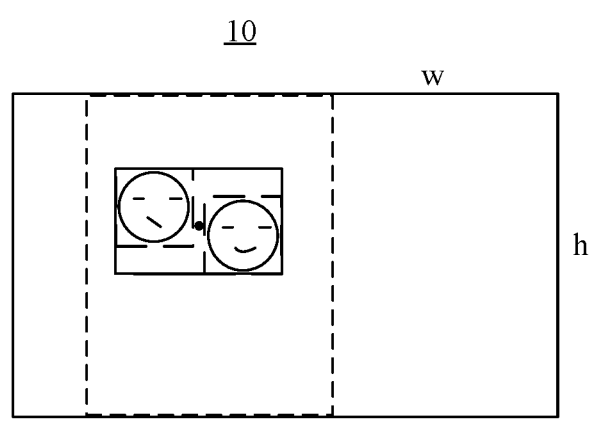
FIG. 4c is a schematic diagram of another scenario of an image processing method according to an embodiment of this application.

Referring to FIG. 4c, first width information of the image to be processed is w and the first height information thereof is h, and the second width information of the target size information of the thumbnail is w' and the second height information thereof is h'. In a case of detecting that an aspect ratio w/h of the size information is larger than an aspect ratio w'/h' of the target size information of the thumbnail, the server may fix an edge of the first height information h, and crop an edge of the first width information w; may calculate cropped third width information w1=hw'/h' to cause w/h=w'/h', where a ratio of the calculated third width information w1 to the first height information h is equal to the aspect ratio w'/h' of the target size information; and crops the image to be processed by using w1 and h as the cropped size information, so that an aspect ratio of a cropped image is same as the aspect ratio of the thumbnail.

In step 206, in a case of detecting that the aspect ratio of the size information is smaller than the aspect ratio of the target size information, the server obtains the first width information of the size information, the second width information of the target size information, and the second height information of the target size information; calculates third height information based on the first width information, the second width information, and the second height information; and determines the cropped size information according to the third height information and the first width information.

In a case of detecting that the aspect ratio w/h of the size information is smaller than the aspect ratio w'/h' of the target size information of the thumbnail, the server may fix an edge of the first width information w, and crop an edge of the first height information h; may calculate cropped third height information h1=wh'/w' to cause w/h=w'/h', where a ratio of the first width information w to the calculated third height information h1 is equal to the aspect ratio w'/h' of the target size information; and crops the image to be processed by using w and h1 as the cropped size information, so that an aspect ratio of a cropped image is same as the aspect ratio of the thumbnail.

In step 207, the server crops the image to be processed according to the cropped size information to obtain the cropped image.

Referring to FIG. 4c, the server may use the target center point as a cropping reference center, and crop the image to be processed according to the cropped size information, to obtain the cropped image framed by dotted lines.

In step 208, the server determines the cropped image as a target image in a case of detecting that a position of the target center point in the cropped image is located in an upper half region of the cropped image.

Figure 4D:
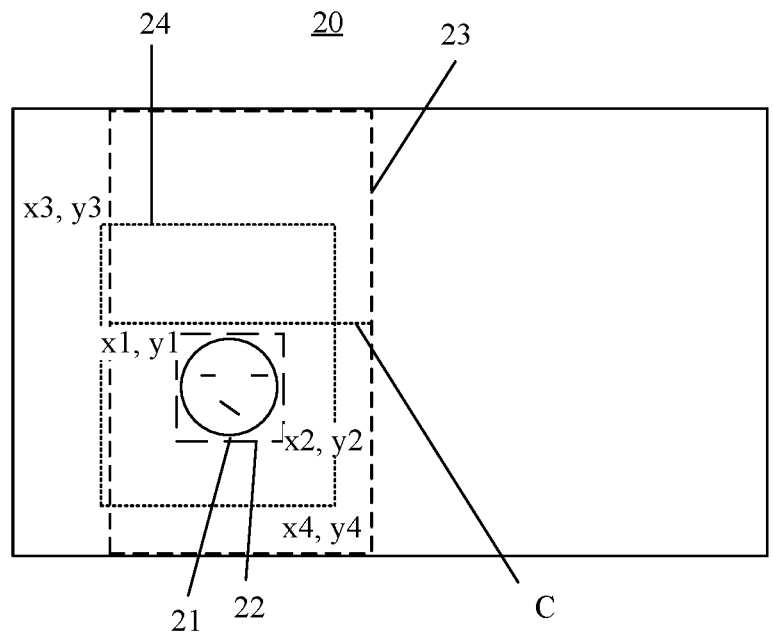
FIG. 4d is a schematic diagram of another scenario of an image processing method according to an embodiment of this application.

Referring to FIG. 4d, a cropped image 23 includes a center line C, and the center line C divides the cropped image into an upper half region and a lower half region. In one scenario, when a face is located in the lower half region, the cropping may cause that the face in a thumbnail is located in the lower half region of the image, so that the publicity effect and aesthetics of the thumbnail are affected. Therefore, the server may pre-detect whether the position of the target center point in the cropped image is located in the upper half region of the cropped image. When the server detects that the position of the target center point in the cropped image is located in the upper half region of the cropped image, it indicates that the face is located in the upper half region of the image, and the cropped image may be directly determined as the target image.

In step 209, in a case of detecting that the position of the target center point in the cropped image is not located in the upper half region of the cropped image, the server obtains a first target identification box corresponding to target facial feature information in the image to be processed.

Referring to FIG. 4d, when the server detects that the position of the target center point in the cropped image is not located in the upper half region of the cropped image, it indicates that a face 21 is located in the lower half region of the image. To avoid affecting the publicity effect and aesthetics of the thumbnail, in this embodiment, a first target identification box 22 corresponding to the target facial feature information in the image to be processed may be obtained, and a region of the first target identification box may be represented by coordinates (x1, y1) at an upper left corner and coordinates (x2, y2) at a lower right corner.

In step 210, the server expands the first target identification box by a preset multiple, to obtain an expanded second target identification box; and obtains fourth width information and fourth height information of the second target identification box, the second width information of the target size information, and the second height information of the target size information.

The preset multiple may be 2 or 3 times, or the like, and may be set according to an specific image processing situations or be set by the user. Still referring to FIG. 4d, the preset multiple being 2 times is described in this embodiment. The server may expand a first target identification box 22 by 2 times, to obtain an expanded second target identification box 24. A region of the second target identification box 24 may be represented by coordinates (x3, y3) at the upper left corner and coordinates (x4, y4) at the lower right corner. Because an aspect ratio of the second target identification box is different from the aspect ratio of the thumbnail, the second target identification box needs to be supplemented, that is, fourth width information x4−x3 and fourth height information y4−y3 of the second target identification box, second width information w' of the target size information, and second height information h' of the target size information may be obtained.

In step 211, the server calculates fifth height information based on the fourth width information, the second width information, and the second height information; determines sixth height information according to a difference between the fifth height information and the fourth height information; determines size information of an additional box according to the fourth width information and the sixth height information; merges the second target identification box and the additional box, to obtain a third target identification box; and determines the third target identification box as the target image.

When a width of the second target identification box 24 is fixed, the server may calculate the fifth height information through a formula h'(x4−x3)/w', and a ratio of the fourth width information of the second target identification box 24 to the calculated fifth height information is equal to the aspect ratio of the thumbnail, that is, the calculated fifth height information may enable an aspect ratio of the second target identification box 24 to be equal to that of the thumbnail.

Figure 4E:
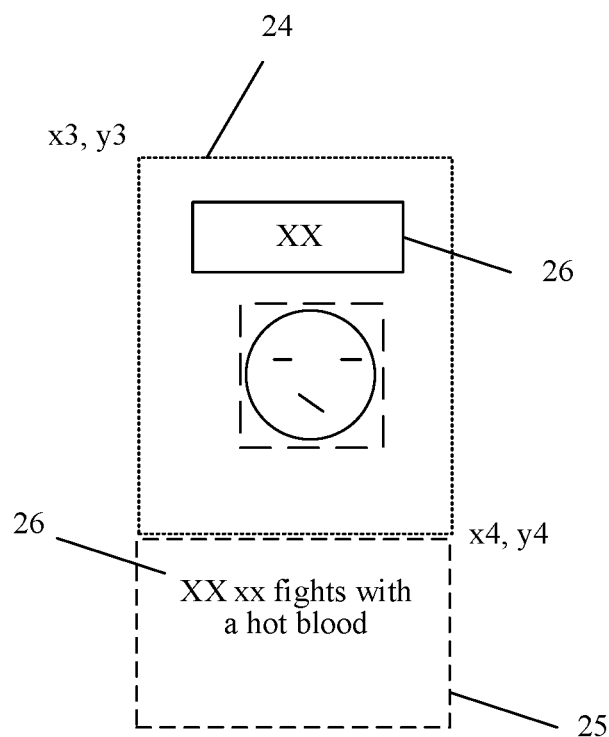
FIG. 4e is a schematic diagram of another scenario of an image processing method according to an embodiment of this application.

Further, the sixth height information is determined according to the difference between the fifth height information and the fourth height information. Referring to FIG. 4e, size information of an additional box 25 connected to a lower part of the second target identification box 24 is determined according to the fourth width information and the sixth height information, the second target identification box 24 and the additional box 25 are merged so that a third target identification box can be obtained. An aspect ratio of the third target identification box is equal to the aspect ratio of the thumbnail. Further, the third target identification box may be determined as the target image.

In one embodiment, to realize the aesthetics effect of the target image, the server may select color information from an edge of the second target identification box 24 bordering with the additional box 25, determine target color information with most pieces of color information, such as purple, and then generate a color of the additional box 25 with the purple. In addition, to further increase the aesthetics effect of the target image, transparency gradient processing may also be performed from a middle position of the target image to a dividing position of the additional box 25.

In one embodiment, the target image is deleted in a case of detecting that a region in the target image does not belong to the image to be processed.

To prevent a main body of the target image from exceeding the outside of the image to be processed, it is necessary to detect whether the region in the target image belongs to the image to be processed, that is, whether the target image has a part that does not belong to the image to be processed. For example, coordinates of the target center point are (x5, y5), and it may be calculated whether the target image has a region that exceeds the image to be processed according to the coordinates of the center point and a width and a height of the target image. When it is detected that the region in the target image does not belong to the image to be processed, that is, when the target image has the region that exceeds the image to be processed, it indicates that the target image is unqualified and cannot be cropped, and the target image may be deleted. Correspondingly, when it is detected that the region in the target image belongs to the image to be processed, that is, the target image does not have the region that exceeds the image to be processed, it indicates that the target image is qualified, and the subsequent steps are performed.

In step 212, the server reserves a scaled target image in a case of detecting that definition information of the scaled target image meets a preset threshold; adds a preset display control for the scaled target image; and scales the target image to the target size information.

The server may also screen definitions of target images, and filters target images that are not clear, to ensure the quality of the target images. In this embodiment, a Laplacian operator calculation principle of OpenCV (a cross-platform computer vision and machine learning software library) may be used to evaluate the definition information. The principle is that: if a variance of an image is high, it means that the image has a wide range of responses including a type edge and a non-type edge, which is representative of a normal focused image. However, if the variance is low, the image has little response spread, which indicates that there are few edges in the image. A blurrier image indicates fewer edges. Therefore, the variance may be used for detecting whether the image is blurry, and a Laplacian operator may be used for edge detection. Therefore, a reasonable preset threshold can be set, such as 0.8.

When the server detects that the definition information of the scaled target image is larger than 0.8, that is, the definition information of the target image meets the preset threshold, the scaled target image may be reserved. Still referring to FIG. 4e, a preset display control 26 may be further added for the scaled target image, to enhance the publicity effect of the target image.

Finally, the target image may be scaled to the target size information. Because the aspect ratio is the same, the target image may be directly scaled to the target size information, to generate a corresponding poster image for publicity, and manual intervention is not required, which greatly improves the image processing efficiency.

It is understood from the above that, in this embodiment, an image to be processed and size information corresponding to the image to be processed are obtained; a target center point is determined according to position information of facial feature information in the image to be processed; cropped size information is determined according to an aspect ratio relationship between the size information and target size information; the image to be processed is cropped based on the target center point and the cropped size information to obtain a target image; and the target image is scaled to the target size information, to generate a thumbnail with the target size information. In this way, the target center point of the image is determined according to the facial feature information, the cropped size information is determined according to the aspect ratio relationship between the size information and the target size information for cropping to obtain the target image whose aspect ratio meets a requirement, and the target image is scaled to the target size information to quickly generate a thumbnail that meets the requirement. Compared with the solution in which a poster image needs to be selected and edited manually, manual intervention is not required in this embodiment, which greatly improves the image processing efficiency.

Further, in this embodiment, in a case of detecting that a position of the target center point in a cropped image is not located in a cropped upper half region, the target image can also be generated in an expansion manner, to ensure that a face is always located in a reasonable position in the target image, and subsequent manual modification is not required, thereby improving the image processing efficiency, and ensuring the publicity effect.

To help better implement the image processing method provided in the embodiments of this application, an apparatus based on the foregoing image processing method is further provided in the embodiments of this application. Terms have meanings the same as those in the foregoing image processing method. For specific implementation details, reference may be made to the description in the method embodiments.

Figure 5:
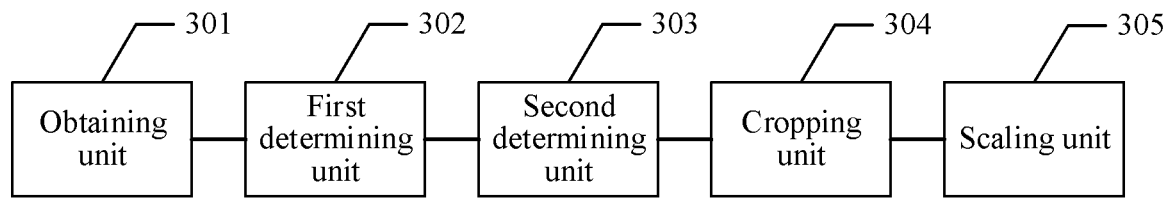
FIG. 5 is a schematic structural diagram of an image processing apparatus according to an embodiment of this application.

FIG. 5 is a schematic structural diagram of an image processing apparatus according to an embodiment of this application. The image processing apparatus may include: an obtaining unit 301, a first determining unit 302, a second determining unit 303, a cropping unit 304, a scaling unit 305, and the like.

The obtaining unit 301 is configured to obtain an image to be processed and size information corresponding to the image to be processed.

The first determining unit 302 is configured to determine a target center point of the image to be processed according to position information of facial feature information in the image to be processed.

In one embodiment, the first determining unit 302 includes:
an obtaining subunit, configured to obtain an identification box corresponding to the facial feature information in the image to be processed;

a first determining subunit, configured to determine, in a case of detecting that the image to be processed includes a single identification box, the target center point according to the single identification box; and a second determining subunit, configured to connect, in a case of detecting that the image to be processed includes a plurality of identification boxes, the plurality of identification boxes to generate a target connection box, and determine the target center point according to the target connection box.

In one embodiment, the obtaining subunit is configured to:
extract the facial feature information in the image to be processed by a trained multi-task convolutional neural network model; and determine the corresponding identification box according to the position information of the facial feature information.

The second determining unit 303 is configured to determine cropped size information according to an aspect ratio relationship between the size information and target size information, the target size information being size information of a thumbnail that is to be generated and corresponds to the image to be processed.

In one embodiment, the second determining unit 303 includes a third determining subunit, configured to:
in a case of detecting that an aspect ratio of the size information is larger than the aspect ratio of the target size information, obtain first height information of the size information, second width information of the target size information, and second height information of the target size information;

calculate third width information based on the first height information, the second width information, and the second height information, where a ratio of the calculated third width information to the first height information is equal to the aspect ratio of the target size information; and determine the cropped size information according to the third width information and the first height information.

In some embodiments, the second determining unit 303 further includes a fourth determining subunit, configured to:
in a case of detecting that an aspect ratio of the size information is smaller than the aspect ratio of the target size information, obtain first width information of the size information, second width information of the target size information, and second height information of the target size information;

calculate third height information based on the first width information, the second width information, and the second height information, where a ratio of the first width information to the calculated third height information is equal to the aspect ratio of the target size information; and determine the cropped size information according to the third height information and the first width information.

The cropping unit 304 is configured to crop the image to be processed based on the target center point and the cropped size information to obtain a target image, an aspect ratio of the target image being same as an aspect ratio of the target size information.

In some embodiments, the cropping unit 304 includes:
a cropping subunit, configured to crop the image to be processed according to the cropped size information to obtain a cropped image, where the cropped image includes the target center point; and a fifth determining subunit, configured to determine the cropped image as the target image in a case of detecting that a position of the target center point in the cropped image is located in an upper half region of the cropped image.

In some embodiments, the cropping unit further includes:

an obtaining subunit, configured to obtain a first target identification box corresponding to target facial feature information in the image to be processed in a case of detecting that the position of the target center point in the cropped image is not located in the upper half region of the cropped image;

an expansion subunit, configured to expand the first target identification box by a preset multiple, to obtain an expanded second target identification box;

an addition subunit, configured to add an additional box for the second target identification box, to obtain an added third target identification box, where an aspect ratio of the third target identification box is same as the aspect ratio of the target size information; and a sixth determining subunit, configured to determine the third target identification box as the target image.

In some embodiments, the addition subunit is configured to:

obtain fourth width information and fourth height information of the second target identification box, the second width information of the target size information, and the second height information of the target size information;

calculate fifth height information based on the fourth width information, the second width information, and the second height information, where a ratio of the fourth width information of the second target identification box to the calculated fifth height information is equal to the aspect ratio of the target size information;

determine sixth height information according to a difference between the fifth height information and the fourth height information;

determine size information of the additional box according to the fourth width information and the sixth height information; and merge the second target identification box and the additional box, to obtain the third target identification box.

In some embodiments, the apparatus further includes a deletion unit, configured to:

delete the target image in a case of detecting that a region in the target image does not belong to the image to be processed.

The scaling unit 305 is configured to scale the target image to the target size information, to generate the thumbnail with the target size information.

In some embodiments, the apparatus further includes an addition unit, configured to:

reserve a scaled target image in a case of detecting that definition information of the scaled target image meets a preset threshold; and add a preset display control for the scaled target image.

For specific implementation of the foregoing units, reference may be made to the foregoing embodiments, which are not described repeatedly herein.

It is understood from the above that, in this embodiment, an obtaining unit 301 obtains an image to be processed and size information corresponding to the image to be processed; a first determining unit 302 determines a target center point according to position information of facial feature information in the image to be processed; a second determining unit 303 determines cropped size information according to an aspect ratio relationship between the size information and target size information; a cropping unit 304 crops the image to be processed based on the target center point and the cropped size information to obtain a target image; and a scaling unit 305 scales the target image to the target size information, to generate the thumbnail with the target size information. In this way, the target center point of the image is determined according to the facial feature information, the cropped size information is determined according to the aspect ratio relationship between the size information and the target size information for cropping to obtain the target image whose aspect ratio meets a requirement, and the target image is scaled to the target size information to quickly generate a thumbnail that meets the requirement. Compared with the solution in which a poster image needs to be selected and edited manually, manual intervention is not required in this embodiment, which improves the image processing efficiency.

Figure 6:
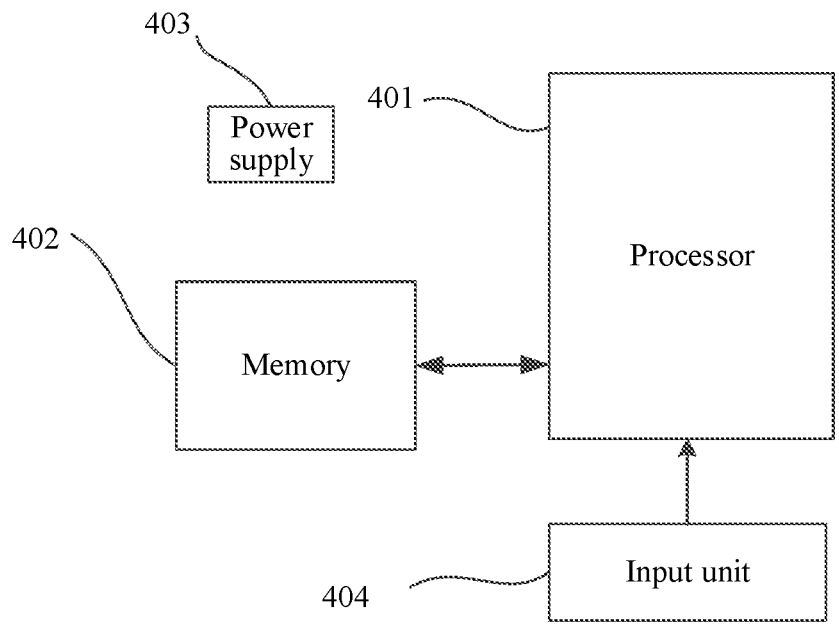
FIG. 6 is a schematic structural diagram of a server according to an embodiment of this application.

An embodiment of this application further provides a computer device, and the computer device may be a server or a terminal. FIG. 6 is a schematic structural diagram of a server according to an embodiment of this application. Specifically:

The computer device may include components such as a processor 401 including one or more processing cores, a memory 402 including one or more computer-readable storage media, a power supply 403, and an input unit 404. A person skilled in the art may understand that, the structure of the computer device shown in FIG. 6 does not constitute a limitation to the computer device. The computer device may include components that are more or fewer than those shown in the figure, or some components may be combined, or a different component deployment may be used. The processor 401 is a control center of the computer device, and connects various parts of the entire computer device by using various interfaces and lines. By running or executing software programs and/or modules stored in the memory 402, and invoking data stored in the memory 402, the processor performs various functions and data processing of the computer device, thereby performing overall monitoring on the computer device. In some embodiments, the processor 401 may include one or more processing cores. In some embodiments, the processor 401 may integrate an application processor and a modem. The application processor processes an operating system, a user interface, an application program, and the like. The modem processes wireless communication. It can be understood that the foregoing modem processor may alternatively not be integrated into the processor 401.

The memory 402 may be configured to store a software program and module. The processor 401 runs the software program and module stored in the memory 402, to implement various functional applications and data processing of the mobile phone. The memory 402 may include a program storage area and a data storage area. The program storage area may store an operating system, an application program required by at least one function (for example, a sound playing function and an image playing function), or the like. The data storage area may store data created according to use of the server. In addition, the memory 402 may include a high speed random access memory, and may also include a non-volatile memory, such as at least one magnetic disk storage device, a flash memory, or another volatile solid-state storage device. Correspondingly, the memory 402 may further include a memory controller, so that the processor 401 can access the memory 402.

The computer device further includes the power supply 403 supplying power to the components. In some embodiments, the power supply 403 may be logically connected to the processor 401 by a power management system, thereby implementing functions such as charging, discharging, and power consumption management by using the power management system. The power supply 403 may further include one or more direct current or alternating current power supplies, a re-charging system, a power failure detection circuit, a power supply converter or inverter, a power supply state indicator, and any other component.

The computer device may further include the input unit 404. The input unit 404 may be configured to receive entered numeric or character information and generate keyboard, mouse, joystick, optical, or trackball signal input related to user settings and function control.

Although not shown in the figure, the computer device may further include a display unit, and the like. Details are not described herein again. In this embodiment, the processor 401 in the computer device may load executable files corresponding to processes of one or more application programs to the memory 402 according to the following instructions, and the processor 401 runs the application program stored in the memory 402, to implement various method steps provided in the foregoing embodiments as follows:

obtaining an image to be processed and size information corresponding to the image to be processed; determining a target center point according to position information of facial feature information in the image to be processed; determining cropped size information according to an aspect ratio relationship between the size information and target size information; cropping the image to be processed based on the target center point and the cropped size information to obtain a target image, an aspect ratio of the target image being same as an aspect ratio of the target size information; and scaling the target image to the target size information.

In the foregoing embodiments, the descriptions of the embodiments have respective focuses. For a part that is not described in detail in an embodiment, refer to the foregoing detailed description of the image processing method. Details are not described herein again.

It is understood from the above that, the computer device in this embodiment may obtain an image to be processed and size information corresponding to the image to be processed; a target center point is determined according to position information of facial feature information in the image to be processed; cropped size information is determined according to an aspect ratio relationship between the size information and target size information; the image to be processed is cropped based on the target center point and the cropped size information to obtain a target image; and the target image is scaled to the target size information. In this way, the target center point of the image is determined according to the facial feature information, the cropped size information is determined according to the aspect ratio relationship between the size information and the target size information for cropping to obtain the target image whose aspect ratio meets a requirement, and the target image is scaled to the target size information to quickly generate a thumbnail that meets the requirement. Compared with the solution in which a poster image needs to be selected and edited manually, manual intervention is not required in this embodiment, which greatly improves the image processing efficiency.

A person of ordinary skill in the art may understand that, all or some steps of the methods of the foregoing embodiments may be implemented through instructions, or implemented through instructions controlling relevant hardware, and the instructions may be stored in a computer-readable storage medium and loaded and executed by a processor.

Accordingly, the embodiments of this application provide a computer-readable storage medium, storing a plurality of instructions, the instructions being loaded by a processor, to perform the steps in any one of the image processing method according to the embodiments of this application. For example, the instructions may perform the following steps:

obtaining an image to be processed and size information corresponding to the image to be processed; determining a target center point according to position information of facial feature information in the image to be processed; determining cropped size information according to an aspect ratio relationship between the size information and target size information; cropping the image to be processed based on the target center point and the cropped size information to obtain a target image, an aspect ratio of the target image being same as an aspect ratio of the target size information; and scaling the target image to the target size information.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions, to cause the computer device to perform the method provided in the various implementations in the foregoing embodiments.

For specific implementation of the foregoing operations, reference may be made to the foregoing embodiments. Details are not described herein again.

The computer-readable storage medium may include: a read-only memory (ROM), a random access memory (RAM), a magnetic disk, an optical disc or the like.

Because the instructions stored in the computer-readable storage medium may perform the steps of any image processing method provided in the embodiments of this application, the computer program can implement beneficial effects that may be implemented by any image processing method in the embodiments of this application. For details, refer to the foregoing embodiments. Details are not described herein again.

The image processing method and apparatus, the computer-readable storage medium provided in the embodiments of this application are described in detail above. The principles and implementations of this application are described through specific examples in this specification and the descriptions of the embodiments are only intended to help understand the methods and core ideas of this application. Meanwhile, a person of ordinary skill in the art may make modifications to the specific implementations and application scopes according to the ideas of this application. In conclusion, the content of the specification should not be construed as a limitation to this application.

What is claimed is:

1. An image processing method, performed by a computer device, the method comprising:

obtaining an image and size information corresponding to the image;

determining a target center point of the image according to position information of facial feature information in the image, comprising:
  determining one or more identification boxes corresponding to the facial feature information in the image;
  in response to the image comprises a single identification box, determining the target center point according to the single identification box; and
  in response to the image comprises a plurality of identification boxes, connecting the plurality of identification boxes to generate a target connection box, and determining the target center point according to the target connection box;
determining cropped size information according to an aspect ratio relationship between the size information and target size information, the target size information being size information of a thumbnail that is to be generated and corresponds to the image;
cropping the image based on the target center point and the cropped size information to obtain a target image, an aspect ratio of the target image being same as an aspect ratio of the target size information; and
scaling the target image according to the target size information, to generate the thumbnail with the target size information.

2. The image processing method according to claim 1, wherein the obtaining an identification box corresponding to the facial feature information in the image to be processed comprises:
  extracting the facial feature information in the image by a trained multi-task convolutional neural network model; and
  determining the corresponding identification box according to the position information of the facial feature information.

3. The image processing method according to claim 1, wherein the determining cropped size information according to an aspect ratio relationship between the size information and target size information comprises:
  if an aspect ratio of the size information is larger than the aspect ratio of the target size information, obtaining first height information of the size information, second width information of the target size information, and second height information of the target size information;
  calculating third width information based on the first height information, the second width information, and the second height information, wherein a ratio of the calculated third width information to the first height information is equal to the aspect ratio of the target size information; and
  determining the cropped size information according to the third width information and the first height information.

4. The image processing method according to claim 1, wherein the determining cropped size information according to an aspect ratio relationship between the size information and target size information comprises:
  if an aspect ratio of the size information is smaller than the aspect ratio of the target size information, obtaining first width information of the size information, second width information of the target size information, and second height information of the target size information;
  calculating third height information based on the first width information, the second width information, and the second height information, wherein a ratio of the first width information to the calculated third height information is equal to the aspect ratio of the target size information; and
  determining the cropped size information according to the third height information and the first width information.

5. The image processing method according to claim 1, wherein the cropping the image to be processed based on the target center point and the cropped size information to obtain a target image comprises:
  cropping the image according to the cropped size information to obtain a cropped image, wherein the cropped image comprises the target center point; and
  determining the cropped image as the target image if a position of the target center point in the cropped image is located in an upper half region of the cropped image.

6. The image processing method according to claim 5, further comprising:
  obtaining a first target identification box corresponding to target facial feature information in the image if the position of the target center point in the cropped image is not located in the upper half region of the cropped image;
  expanding the first target identification box by a multiple, to obtain an expanded second target identification box;
  adding an additional box for the second target identification box, to obtain an added third target identification box, wherein an aspect ratio of the third target identification box is same as the aspect ratio of the target size information; and
  determining the third target identification box as the target image.

7. The image processing method according to claim 6, wherein the adding an additional box for the second target identification box, to obtain an added third target identification box comprises:
  obtaining fourth width information and fourth height information of the second target identification box, the second width information of the target size information, and the second height information of the target size information;
  calculating fifth height information based on the fourth width information, the second width information, and the second height information, wherein a ratio of the fourth width information of the second target identification box to the calculated fifth height information is equal to the aspect ratio of the target size information;
  determining sixth height information according to a difference between the fifth height information and the fourth height information;
  determining size information of the additional box according to the fourth width information and the sixth height information; and
  merging the second target identification box and the additional box, to obtain the third target identification box.

8. The image processing method according to claim 1, further comprising:
  reserving a scaled target image if definition information of the scaled target image meets a threshold; and
  adding a display control for the scaled target image.

9. The image processing method according to claim 1, further comprising:
  deleting the target image if a region in the target image does not belong to the image.

10. A non-transitory computer-readable storage medium, storing a plurality of instructions, the instructions being configured to be loaded by a processor, to perform:

obtaining an image and size information corresponding to the image;

determining a target center point of the image according to position information of facial feature information in the image, comprising:

determining one or more identification boxes corresponding to the facial feature information in the image;

in response to the image comprises a single identification box, determining the target center point according to the single identification box; and in response to the image comprises a plurality of identification boxes, connecting the plurality of identification boxes to generate a target connection box, and determining the target center point according to the target connection box;

determining cropped size information according to an aspect ratio relationship between the size information and target size information, the target size information being size information of a thumbnail that is to be generated and corresponds to the image;

cropping the image based on the target center point and the cropped size information to obtain a target image, an aspect ratio of the target image being same as an aspect ratio of the target size information; and scaling the target image according to the target size information, to generate the thumbnail with the target size information.

11. The computer-readable storage medium according to claim 10, wherein the obtaining an identification box corresponding to the facial feature information in the image to be processed comprises:

extracting the facial feature information in the image by a trained multi-task convolutional neural network model; and determining the corresponding identification box according to the position information of the facial feature information.

12. The computer-readable storage medium according to claim 10, wherein the determining cropped size information according to an aspect ratio relationship between the size information and target size information comprises:

if an aspect ratio of the size information is larger than the aspect ratio of the target size information, obtaining first height information of the size information, second width information of the target size information, and second height information of the target size information;

calculating third width information based on the first height information, the second width information, and the second height information, wherein a ratio of the calculated third width information to the first height information is equal to the aspect ratio of the target size information; and determining the cropped size information according to the third width information and the first height information.

13. The computer-readable storage medium according to claim 10, wherein the determining cropped size information according to an aspect ratio relationship between the size information and target size information comprises:

if an aspect ratio of the size information is smaller than the aspect ratio of the target size information, obtaining first width information of the size information, second width information of the target size information, and second height information of the target size information;

calculating third height information based on the first width information, the second width information, and the second height information, wherein a ratio of the first width information to the calculated third height information is equal to the aspect ratio of the target size information; and determining the cropped size information according to the third height information and the first width information.

14. The computer-readable storage medium according to claim 10, wherein the cropping the image to be processed based on the target center point and the cropped size information to obtain a target image comprises:

cropping the image according to the cropped size information to obtain a cropped image, wherein the cropped image comprises the target center point; and determining the cropped image as the target image if a position of the target center point in the cropped image is located in an upper half region of the cropped image.

15. The computer-readable storage medium according to claim 14, wherein the method further comprising:

obtaining a first target identification box corresponding to target facial feature information in the image if the position of the target center point in the cropped image is not located in the upper half region of the cropped image;

expanding the first target identification box by a multiple, to obtain an expanded second target identification box;

adding an additional box for the second target identification box, to obtain an added third target identification box, wherein an aspect ratio of the third target identification box is same as the aspect ratio of the target size information; and determining the third target identification box as the target image.

16. The computer-readable storage medium according to claim 15, wherein the adding an additional box for the second target identification box, to obtain an added third target identification box comprises:

obtaining fourth width information and fourth height information of the second target identification box, the second width information of the target size information, and the second height information of the target size information;

calculating fifth height information based on the fourth width information, the second width information, and the second height information, wherein a ratio of the fourth width information of the second target identification box to the calculated fifth height information is equal to the aspect ratio of the target size information;

determining sixth height information according to a difference between the fifth height information and the fourth height information;

determining size information of the additional box according to the fourth width information and the sixth height information; and merging the second target identification box and the additional box, to obtain the third target identification box.

17. A computer device, comprising a memory, a processor, and a computer program stored in the memory and run on the processor, the processor, when executing the computer program, implementing:

obtaining an image and size information corresponding to the image;

determining a target center point of the image according to position information of facial feature information in the image, comprising:

determining one or more identification boxes corresponding to the facial feature information in the image;
in response to the image comprises a single identification box, determining the target center point according to the single identification box; and
in response to the image comprises a plurality of identification boxes, connecting the plurality of identification boxes to generate a target connection box, and determining the target center point according to the target connection box;

determining cropped size information according to an aspect ratio relationship between the size information and target size information, the target size information being size information of a thumbnail that is to be generated and corresponds to the image;

cropping the image based on the target center point and the cropped size information to obtain a target image, an aspect ratio of the target image being same as an aspect ratio of the target size information; and scaling the target image according to the target size information, to generate the thumbnail with the target size information.

18. The computer device according to claim 17, the method further comprising:
reserving a scaled target image if definition information of the scaled target image meets a threshold; and
adding a display control for the scaled target image.

* * * * *